US012801984B2

(12) United States Patent
Bidkar et al.

(10) Patent No.: US 12,801,984 B2
(45) Date of Patent: Nov. 17, 2026

(54) SYSTEM AND METHOD FOR MONITORING AND REMOVING DRIFT IN MACHINE LEARNING MODELS

(71) Applicant: BANK OF AMERICA CORPORATION, Charlotte, NC (US)

(72) Inventors: Prashant Anna Bidkar, Shakarpur (IN); Ankit Upadhyaya, Gurugram (IN); Prashant Khare, Navi Mumbai (IN); Parul Malik, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 844 days.

(21) Appl. No.: 18/127,247

(22) Filed: Mar. 28, 2023

(65) Prior Publication Data

US 2024/0330740 A1 Oct. 3, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 8,880,446 | B2 | 11/2014 | Wellman | |
| 9,646,262 | B2 | 5/2017 | Phillipps | |
| 10,555,695 | B2 * | 2/2020 | Böhm | C12Q 1/001 |
| 10,599,957 | B2 | 3/2020 | Walters | |
| 10,614,073 | B2 | 4/2020 | Zhang | |
| 11,003,641 | B2 | 5/2021 | Dundjerski | |
| 11,190,562 | B2 | 11/2021 | Feinstein | |
| 11,481,665 | B2 | 10/2022 | Mopur | |
| 11,631,032 | B2 | 4/2023 | Goodsitt | |
| 11,675,878 | B1 * | 6/2023 | Pandya | G01S 17/86 382/103 |
| 2003/0237000 | A1 * | 12/2003 | Denton | H04W 12/12 709/224 |
| 2014/0180738 | A1 | 6/2014 | Phillipps | |
| 2014/0358828 | A1 | 12/2014 | Phillipps | |
| 2017/0330109 | A1 | 11/2017 | Maughan | |
| 2017/0372232 | A1 | 12/2017 | Maughan | |

(Continued)

FOREIGN PATENT DOCUMENTS

EP 3591586 A1 1/2020

*Primary Examiner* — Jeremy L Stanley
(74) *Attorney, Agent, or Firm* — Moore & Van Allen PLLC; William Walters

(57) ABSTRACT

Systems, computer program products, and methods are described herein for monitoring and removing drift in machine learning models. The present disclosure is configured to receive, from one or more control automation modules, a data stream, wherein the data stream comprises data associated with the one or more control automation modules; transmit the data stream to a gauging and monitoring module; determine whether the data stream matches a declarative mapping protocol; determine one or more deviation instances in an instance in which the data stream does not match the declarative mapping protocol; determine one or more prescriptive actions for the one or more deviation instances; and implement, using an intelligence restoration module, the one or more prescriptive actions on the one or more control automation modules.

18 Claims, 7 Drawing Sheets

(56) References Cited

U.S. PATENT DOCUMENTS

| | | | | |
|---|---|---|---|---|
| 2019/0080253 | A1 | 3/2019 | Lokare | |
| 2019/0102361 | A1 | 4/2019 | Muralidharan | |
| 2020/0219013 | A1 | 7/2020 | Wellman | |
| 2020/0278973 | A1* | 9/2020 | Mylnikov | G06F 16/9024 |
| 2021/0097343 | A1 | 4/2021 | Goodsitt | |
| 2021/0166151 | A1 | 6/2021 | Kennel | |
| 2022/0044133 | A1 | 2/2022 | Otto | |
| 2022/0171373 | A1* | 6/2022 | Chau | G05B 19/41885 |
| 2022/0404235 | A1* | 12/2022 | Cader | G01D 3/08 |
| 2022/0405617 | A1* | 12/2022 | Zeiler | G06N 5/04 |
| 2022/0405619 | A1* | 12/2022 | Ramamurthy | G06F 16/9024 |
| 2023/0091402 | A1 | 3/2023 | Walters | |
| 2023/0112401 | A1* | 4/2023 | Cristache | B25J 5/007<br>701/22 |
| 2023/0168951 | A1* | 6/2023 | Moore | G06F 9/44505<br>719/318 |
| 2023/0282036 | A1* | 9/2023 | Simoudis | G06N 3/08 |
| 2024/0005199 | A1* | 1/2024 | Butvinik | G06Q 20/4016 |
| 2024/0167236 | A1* | 5/2024 | Cristache | H04W 12/08 |
| 2024/0221937 | A1* | 7/2024 | Shelton, IV | G16H 20/40 |

* cited by examiner

SYSTEM AND METHOD FOR MONITORING AND REMOVING DRIFT IN MACHINE LEARNING MODELS

TECHNOLOGICAL FIELD

Example embodiments of the present disclosure relate to the field of machine learning, specifically to a system and method for monitoring and removing drift in machine learning models.

BACKGROUND

Machine learning models are widely used in various industries to automate the decision-making process. However, over time, the phenomenon known as "drift" may be incorporated into the models, leading to incorrect decisions. Applicant has identified a number of deficiencies and problems associated with drift in machine learning models. Through applied effort, ingenuity, and innovation, many of these identified problems have been solved by developing solutions that are included in embodiments of the present disclosure, many examples of which are described in detail herein

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for monitoring and removing drift in machine learning models.

In one aspect, a system for monitoring and removing drift in machine learning models is provided. The system includes at least one processing device and at least one non-transitory storage device containing instructions when executed by the processing device, causes the processing device to perform the steps of: receive, from one or more control automation modules, a data stream, wherein the data stream comprises data associated with the one or more control automation modules; transmit the data stream to a gauging and monitoring module; determine whether the data stream matches a declarative mapping protocol; determine one or more deviation instances in an instance in which the data stream does not match the declarative mapping protocol; determine one or more prescriptive actions for the one or more deviation instances; and implement, using an intelligence restoration module, the one or more prescriptive actions on the one or more control automation modules.

In some embodiments, the executing the instructions further causes the processing device to receive, from one or more control automation modules, a data lake, wherein the data lake comprises data associated with the one or more control automation modules; and transform the data lake into a data stream.

In some embodiments, the executing the instructions further causes the processing device to, in response to transmitting the data stream to the gauging and monitoring module, transmit the data stream to a data distribution analyzer, wherein the data distribution analyzer is configured to create a graphical representation of the data stream, and wherein the graphical representation comprises one or more representations of the data stream; and determine, using an intelligence monitoring module, a deviation classification of the graphical representation.

In some embodiments, the executing the instructions further causes the processing device to determine that the deviation classification is associated with a deviation in performance; determine a retraining protocol in response to determining that the deviation classification is associated with the deviation in performance; and implement the retraining protocol on the one or more control automation modules.

In some embodiments, the executing the instructions further causes the processing device to determine that the deviation classification is associated with a deviation in procedure; determine an intelligent interpretation protocol in response to determining that the deviation classification is associated with the deviation in procedure; and implement the intelligent interpretation protocol on the one or more control automation modules.

In some embodiments, the executing the instructions further causes the processing device to determine, using the intelligence restoration module, a drift classification of the data stream.

In some embodiments, the executing the instructions further causes the processing device to determine that the drift classification is associated with a data drift classification; determine a range of one or more individual features in response to determining that the drift classification is associated with the data drift classification; calculate a data feature importance threshold; and create a suggested data drift model.

In some embodiments, the executing the instructions further causes the processing device to determine that the drift classification is associated with a performance drift classification; transmit the data stream to a bias correction module in response determining that the drift classification is associated with the performance drift classification; monitor the data stream for a concept drift; calculate a performance feature importance threshold; and create a suggested performance drift model.

In some embodiments, the bias correction module further comprises at least one of: a representational bias module configured to mitigate representational bias of the data stream; a confirmation bias module configured to mitigate confirmation bias of the data stream; a selection bias module configured to mitigate selection bias of the data stream; or a survivorship bias module configured to mitigate survivorship bias of the data stream.

In another aspect a computer program product for monitoring and removing drift in machine learning models is provided. The computer program product comprising at least one non-transitory computer-readable medium having computer-readable program code portions embodied therein, the computer-readable program code portions comprising: an executable portion configured to receive, from one or more control automation modules, a data stream, wherein the data stream comprises data associated with the one or more control automation modules; an executable portion configured to transmit the data stream to a gauging and monitoring module; an executable portion configured to determine whether the data stream matches a declarative mapping protocol; an executable portion configured to determine one or more deviation instances in an instance in which the data stream does not match the declarative mapping protocol; an executable portion configured to determine one or more prescriptive actions for the one or more deviation instances; and an executable portion configured to implement, using an intelligence restoration module, the one or more prescriptive actions on the one or more control automation modules.

In yet another aspect, a computer-implemented method for monitoring and removing drift in machine learning models is provided. The computer-implemented method includes: receiving, from one or more control automation modules, a data stream, wherein the data stream comprises data associated with the one or more control automation modules; transmitting the data stream to a gauging and monitoring module; determining whether the data stream matches a declarative mapping protocol; determining one or more deviation instances in an instance in which the data stream does not match the declarative mapping protocol; determining one or more prescriptive actions for the one or more deviation instances; and implementing, using an intelligence restoration module, the one or more prescriptive actions on the one or more control automation modules.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
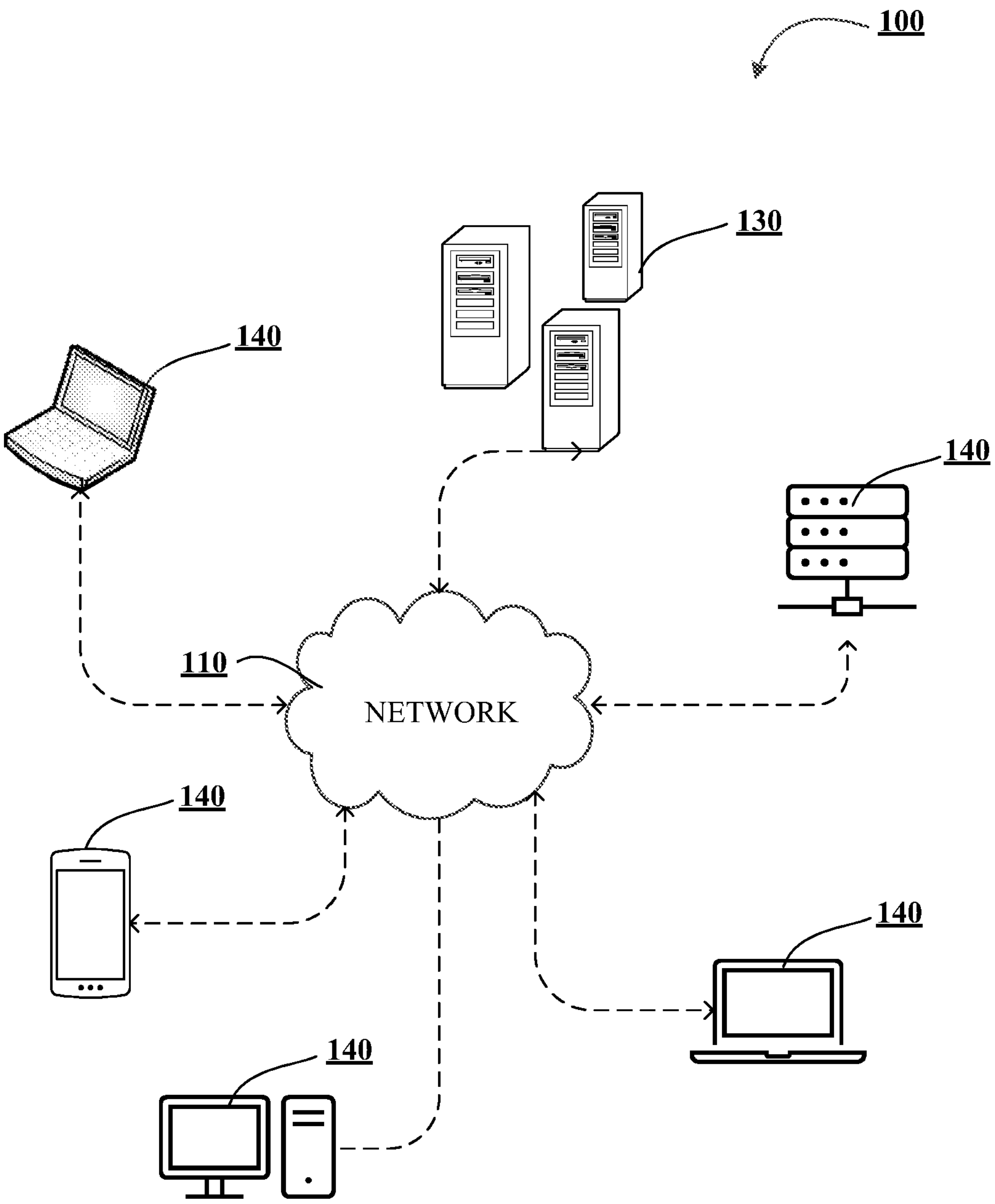
Figure 1B:
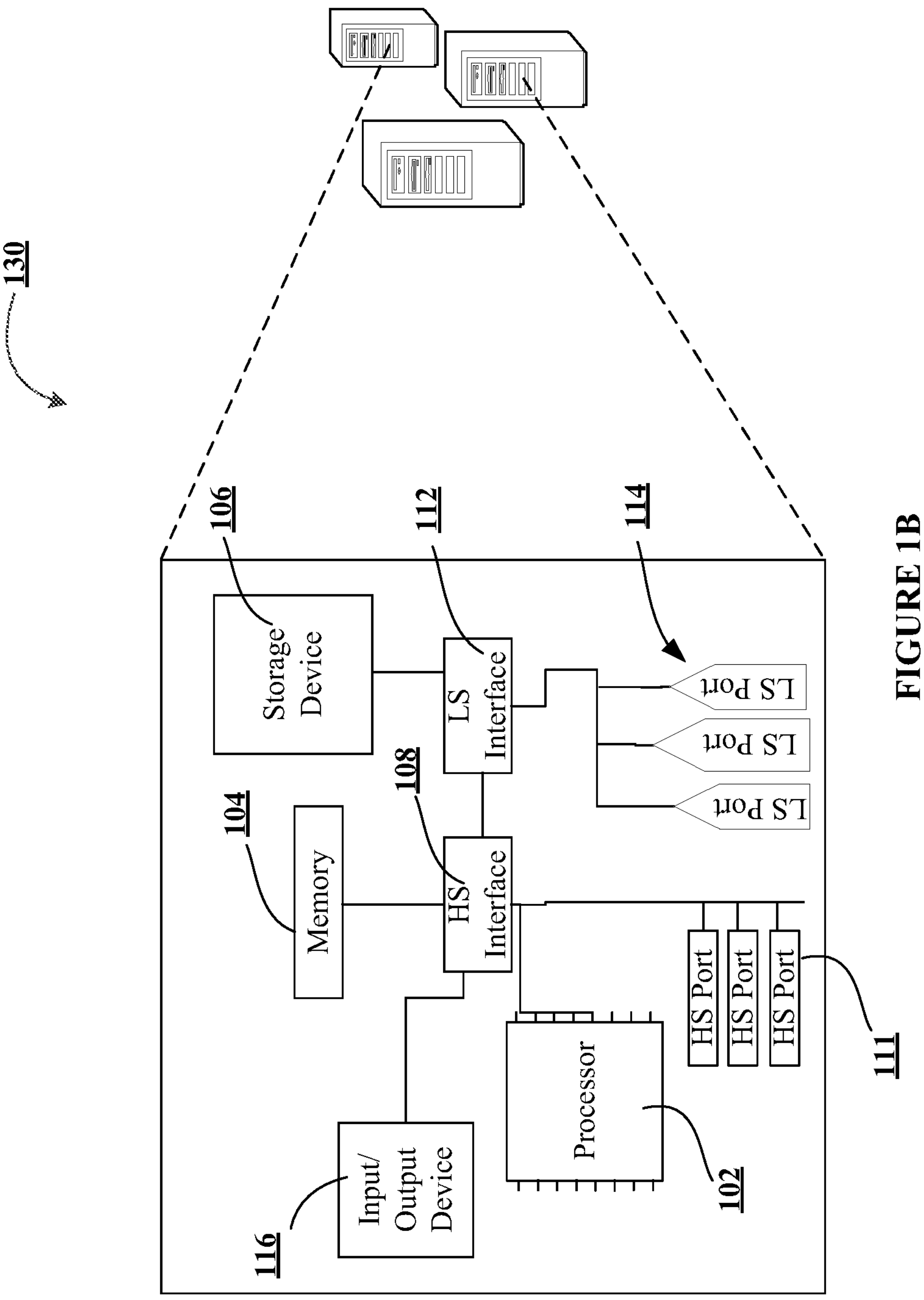
Figure 1C:
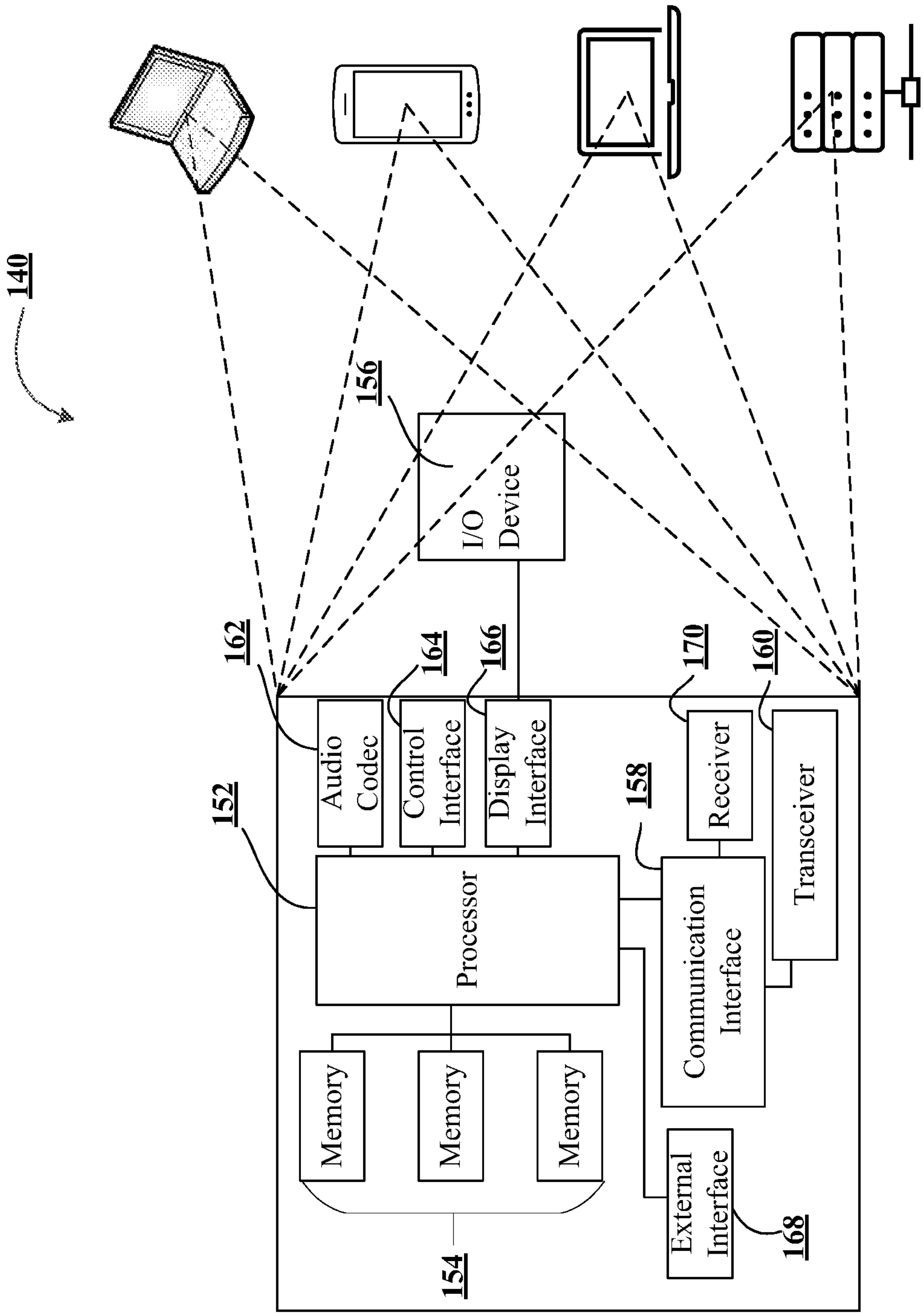
Figure 2:
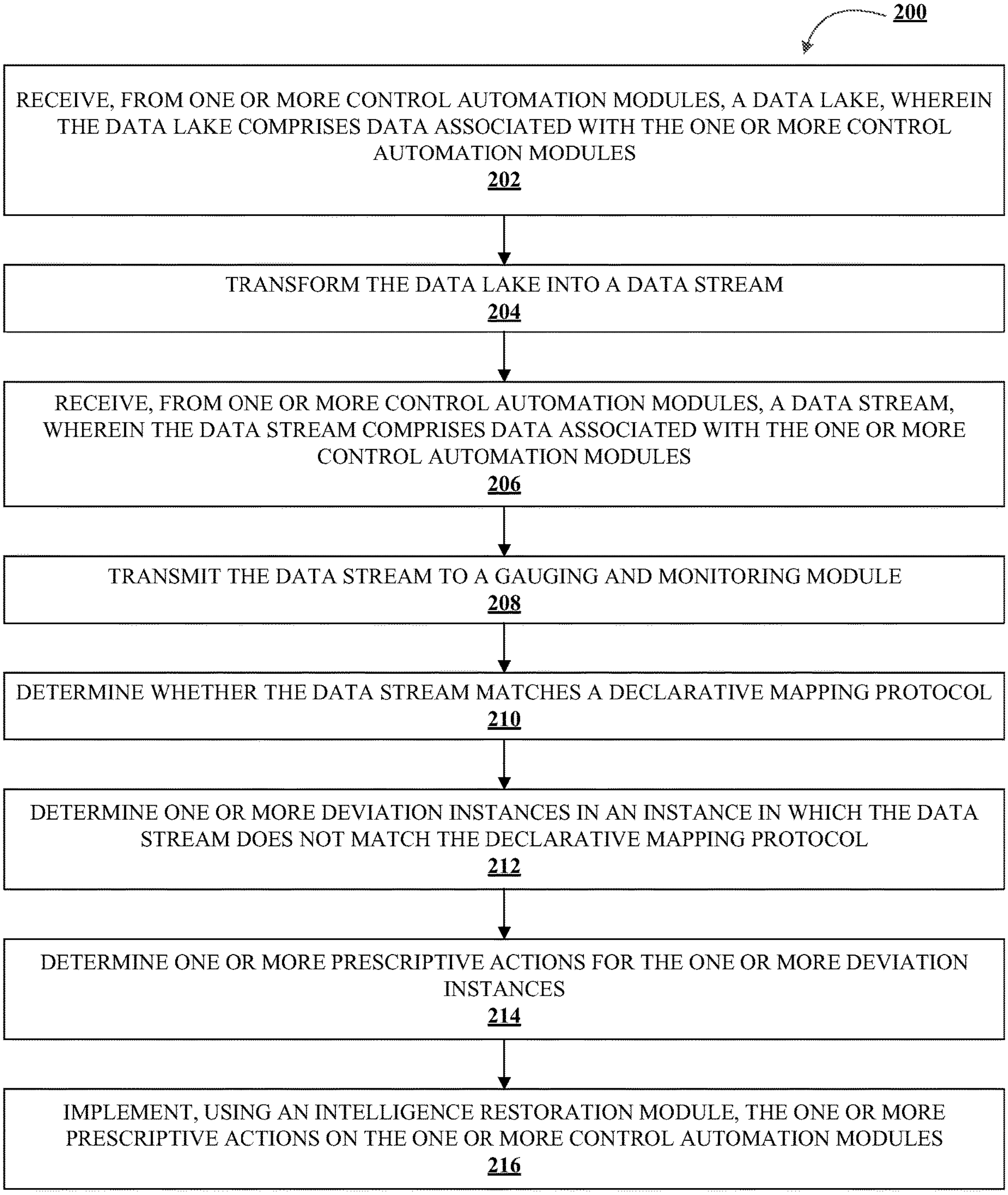

FIGS. 1A-1C illustrates technical components of an exemplary distributed computing environment for monitoring and removing drift in machine learning models, in accordance with an embodiment of the disclosure;

FIG. 2 illustrates a process flow for monitoring and removing drift in machine learning models, in accordance with an embodiment of the disclosure.

Figure 3:
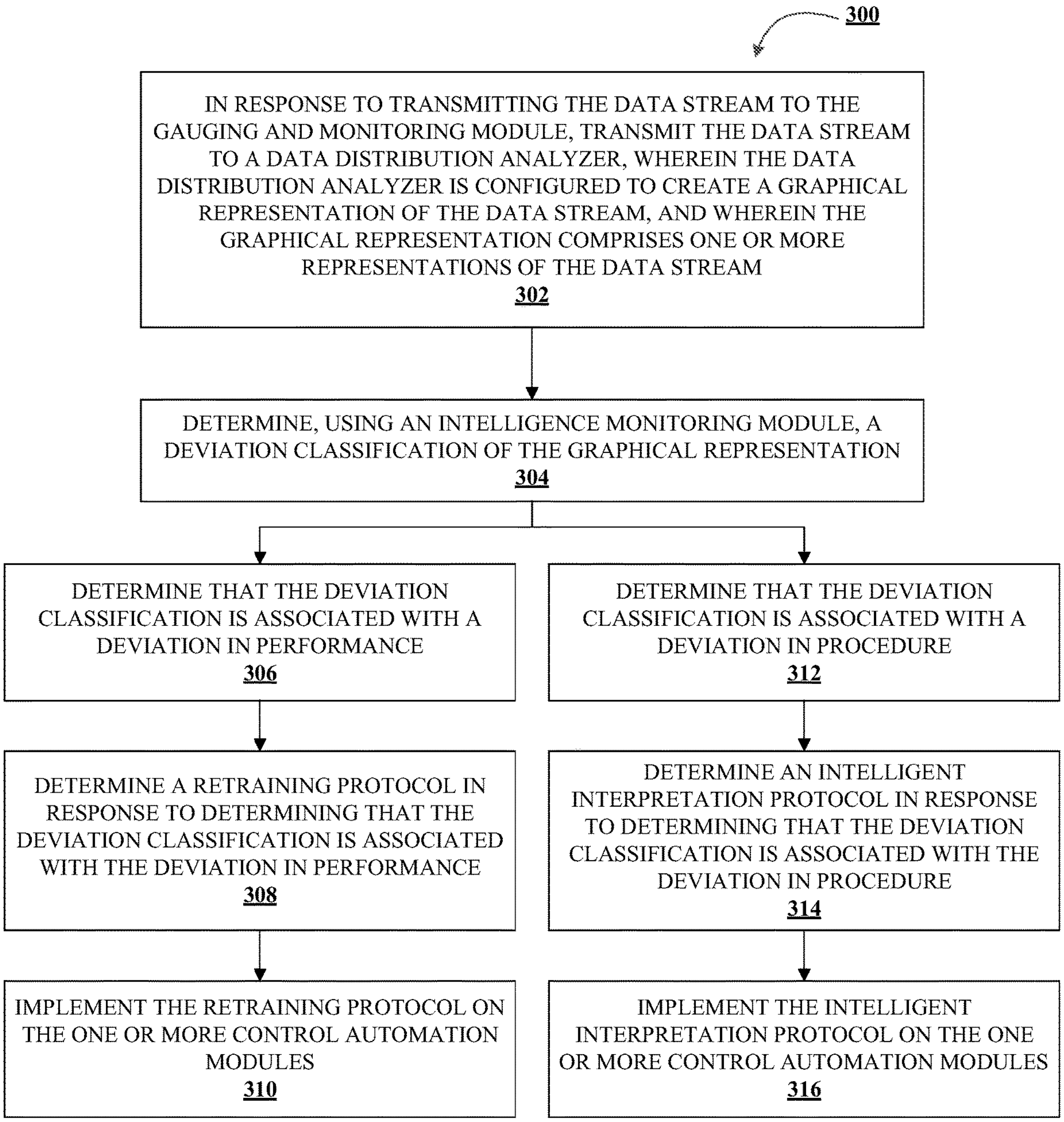

FIG. 3 illustrates a process flow for determining a deviation classification of the graphical representation, in accordance with an embodiment of the disclosure.

Figure 4:
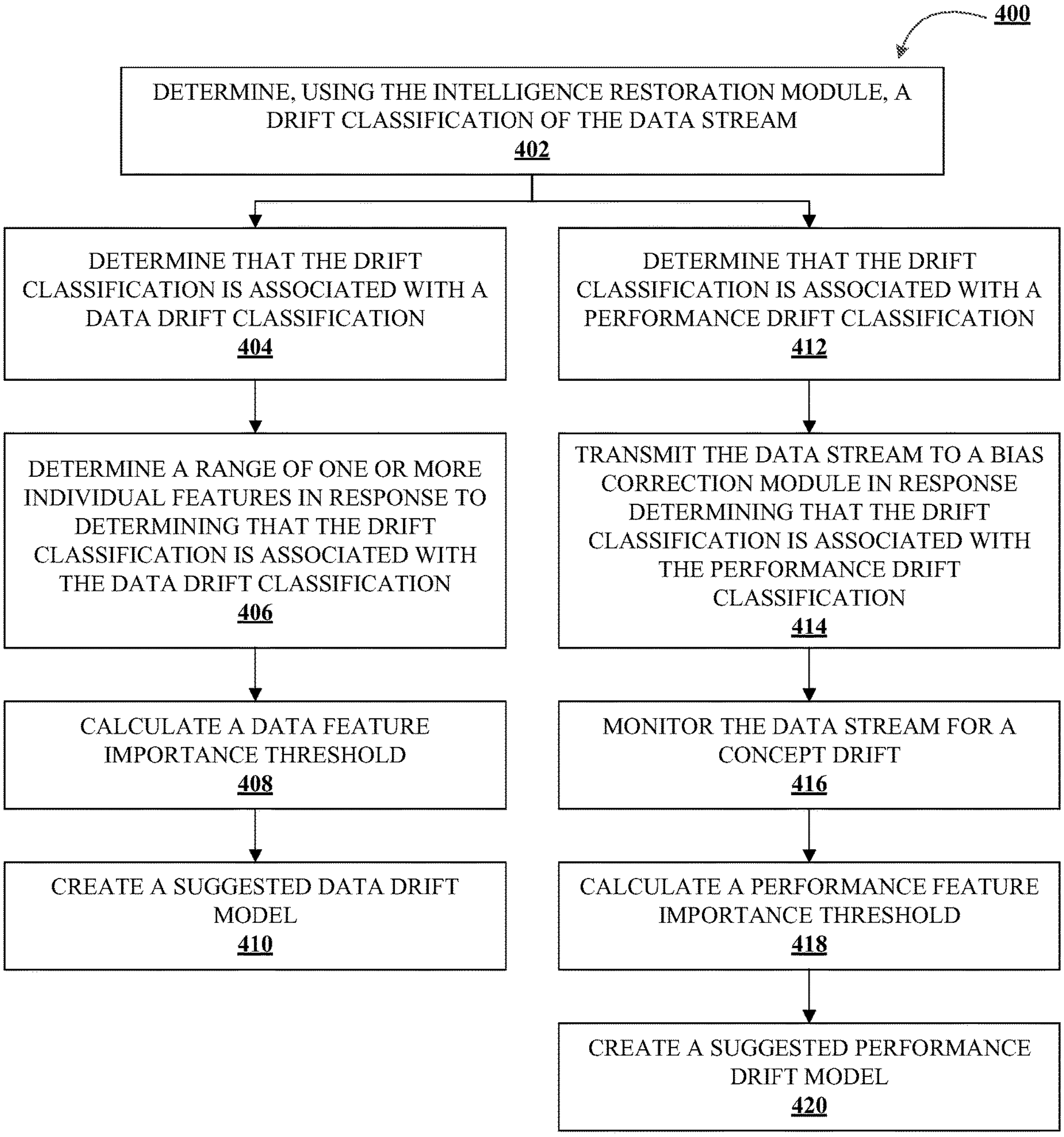

FIG. 4 illustrates a process flow for determining a drift classification of the data stream, in accordance with an embodiment of the disclosure.

Figure 5:
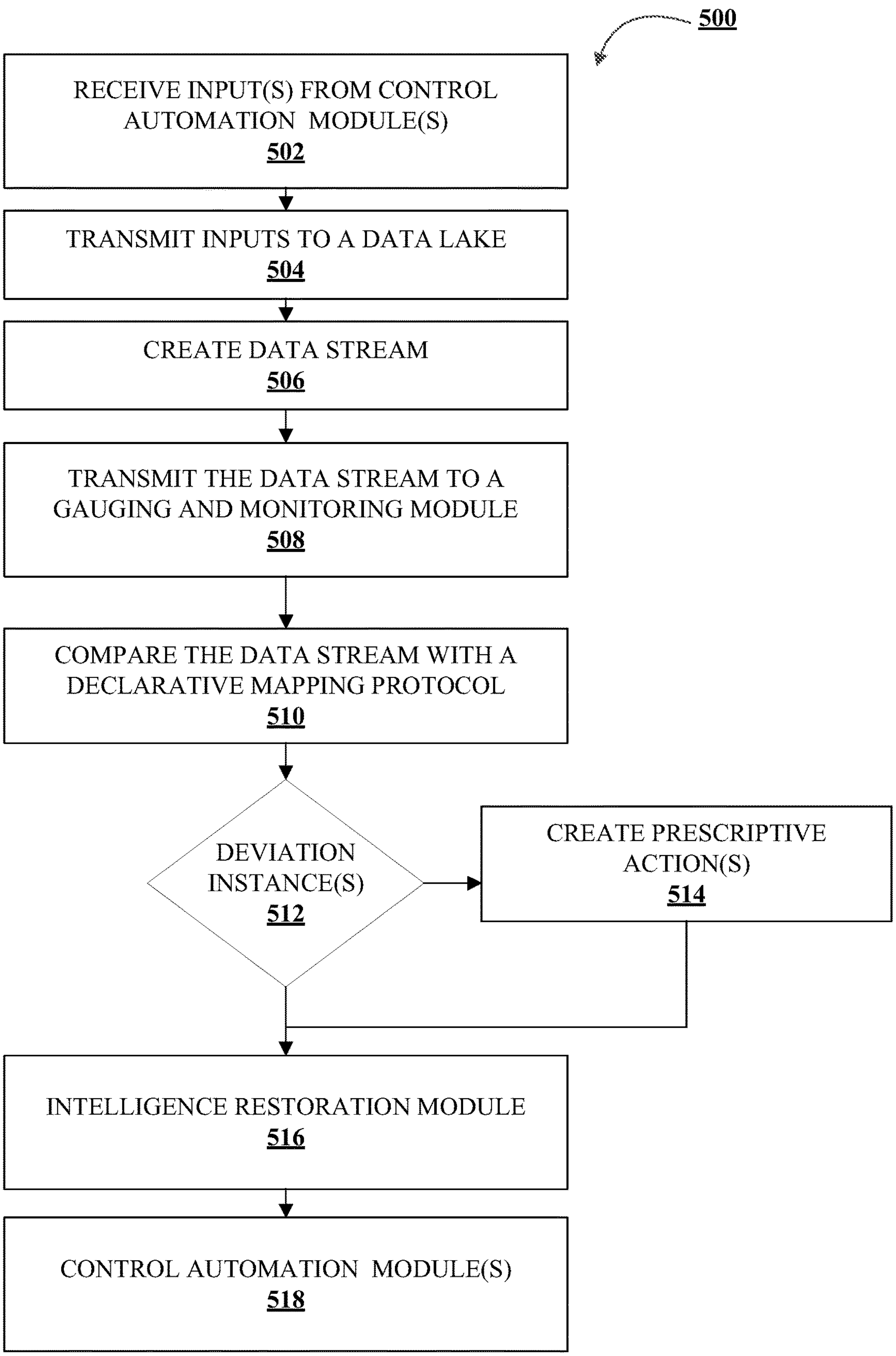

FIG. 5 illustrates a non-limiting example process flow of the drift detection and removal system, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Challenges arise in conventional methods for determining efficacy of control automation systems. Variation in the cognitive models on which the control automation systems work disrupt the effectiveness of the system's outputs. Further, variations in the inputs to the system (e.g., document quality, change in regulatory requirements, change in industry-standard vocabulary, and/or the like) can alter the system's outputs in undesirable ways. Currently, no system exists which measures the intelligence efficacy of control automations. Further, there is no system that exists which can measure the intelligence of different control automation types and restore the intelligence of each in response to any drift from predefined intelligence thresholds. Therefore, a drift detection and removal system is needed to gauge the intelligence of the control automation systems.

Embodiments of the present disclosure provide for monitoring and removing drift in machine learning models. In this regard, and by way of non-limiting example, the drift detection and removal system receives a data stream from one or more control automation modules. The data stream includes data associated with the one or more control automation modules. The drift detection and removal system then determines whether the data stream matches a declarative mapping protocol (e.g., a threshold value analysis on the data associated with the control automation modules). The drift detection and removal system determines one or more deviation instances in an instance in which the data stream does not match the declarative mapping protocol (e.g., the data associated with the control automation modules does not match the threshold values). The drift detection and removal system determines one or more prescriptive actions (e.g., corrective actions) for the one or more deviation instances. The drift detection and removal system implements, using an intelligence restoration module, the one or more prescriptive actions on the one or more control automation modules.

What is more, the present disclosure provides a technical solution to a technical problem. As described herein, the technical problem includes the dynamic, effective, and accurate determination and removal of drift in machine learning models. The technical solution presented herein allows for dynamic, effective, and accurate monitoring and removal of drift in machine learning models. In particular, monitoring and removing drift in machine learning models is an improvement over existing solutions to the dynamic, effective, and accurate determination and removal of drift in machine learning models, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for monitoring and removing drift in machine learning models, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow 200 for a drift detection and removal system, in accordance with example embodiments of the disclosure. The process flow may be carried out by various components of the distributed computing environment 100 discussed herein (e.g., the system 130, one or more end-point device(s) 140, etc.). An example system may include at least one processing device and at least one non-transitory storage device containing instructions when executed by the processing device, causing the processing device to carry out the method discussed herein.

In some embodiments, a drift detection and removal system (e.g., similar to one or more of the systems described herein with respect to FIGS. 1A-1C) may perform one or more of the steps of process flow 200. For example, a drift detection and removal system (e.g., the system 130 described herein with respect to FIGS. 1A-1C) may perform the steps of process flow 200.

As shown in block 202, the process flow 200 of this embodiment includes receiving, from one or more control automation modules, a data lake, wherein the data lake comprises data associated with the one or more control automation modules. In some embodiments, the data lake may take the form of a large storage repository that may hold data in a variety of structured or unstructured forms. In some embodiments, the data in the data lake may be raw data, unstructured data, semi-structured data, structured data, or any combination thereof. In some embodiments, the data in the data lake may be unprocessed (e.g., raw), unformatted, un-styled, and/or the like. In some embodiments, the data in the data lake may be semi-processed, semi-formatted, semi-styled, and/or the like.

As shown in block 204, the process flow 200 of this embodiment includes transforming the data lake into a data stream. In some embodiments, transforming the data lake into a data stream may include performing various operations on the data lake. In some embodiments, the operations (e.g., transformations) may include filtering the data, sorting the data, aggregating the data, cleaning the data, styling the data, formatting the data, processing the data, structuring the data, and/or the like. In some embodiments, transforming the data lake into a data stream may include extracting relevant features of the data lake, removing redundant data, removing noisy data, packaging the data in a format suitable for future processes in the drift detection and removal system, and/or the like.

In some embodiments, transforming the data lake into a data stream may be controlled by the drift detection and removal system. In this way, the drift detection and removal system may determine which operations should be adjusted. In some embodiments, transforming the data lake into a data stream may be controlled by a manager of the drift detection and removal system.

As shown in block 206, the process flow 200 of this embodiment includes receiving, from one or more control automation modules, a data stream, wherein the data stream comprises data associated with the one or more control automation modules. In some embodiments, the one or more control automation modules may include a variety of different types of automation modules. For instance, and by way of non-limiting example, the one or more control automation modules may include modules such as document classification module(s), document field extraction module (s), data validation module(s), data reconciliation module(s), condition monitoring module(s), end decisioning module(s), need of remediation module(s), and/or the like.

In some embodiments, the control automation modules may act independently from other control automation modules. In this way, the control automation modules may receive inputs (e.g., data) independently of other inputs received by other control automation modules. Further, the control automation modules may process the received inputs (e.g., data) independently from other control automation modules. Further still, the control automation modules may output data associated with the control automation modules independently of other control automation modules.

In some embodiments, the control automation modules may interact with one or more other control automation modules. In this regard, the control automation modules may interact with other control automation modules when inputs (e.g., data) are received, when the inputs are processed within the control automation modules, or when output data (e.g., data stream) is transmitted. For instance, and by way of non-limiting example, a document classification module and a document field extraction module may interact in response to determining how a particular document is classified based on which fields in the document are extracted. In this way, the document field extraction module's effectiveness may have an effect on the document classification module's operation.

In some embodiments, the drift detection and removal system may transmit the data associated with the one or more control automation modules to a core control system. In some embodiments, the core control system may package the received data (e.g., the data associated with the one or more control automation modules) into a data lake. In some embodiments, the core control system may initiate a preprocessing protocol on the received data (e.g., the data associated with the one or more control automation modules). In some embodiments, the preprocessing protocol may include data cleaning, data integration, data reduction, data transformation, and/or the like.

As used herein, the "data stream" may include a variety of data transmitted from the one or more control automation modules. In some embodiments, the data stream may be a continuous flow of data from the control automation modules. In some embodiments, the data stream may be processed in such a way so the remaining components (e.g., modules, systems, and/or the like) of the drift detection and removal system need not process the data stream further.

As shown in block 208, the process flow 200 of this embodiment includes transmitting the data stream to a gauging and monitoring module. In some embodiments, the data stream may be continuously transmitted to the gauging and monitoring module.

As shown in block 210, the process flow 200 of this embodiment includes determining whether the data stream matches a declarative mapping protocol. In some embodiments, the gauging and monitoring module may perform a comparison of the data stream and the declarative mapping protocol to determine whether the data stream matches the declarative mapping protocol.

In some embodiments, the declarative mapping protocol may include threshold values of the control automation modules. In some embodiments, the threshold values may be based upon one or more rules and specifications (e.g., expected data type, range of acceptable values, expected frequency of data, and/or the like) which define the expected format and structure of the data stream. In some embodiments, the declarative mapping protocol may define how the data stream should be organized, labeled, and categorized so the drift detection and removal system can accurately gauge and monitor the drift of the control automation modules. In some embodiments, the threshold values may be values on which the control automation modules were initially trained. In some embodiments, the threshold values may include audio quality, legibility, and/or the like.

As shown in block 212, the process flow 200 of this embodiment includes determining one or more deviation instances in an instance in which the data stream does not match the declarative mapping protocol. In some embodiments, the deviation instance(s) may be a predetermined deviation amount between the data stream and the declarative mapping protocol. In some embodiments, the deviation instance(s) may be predetermined by a manager of the drift detection and removal system, a user of the drift detection and removal system, the drift detection and removal system itself, and/or the like. In some embodiments, the predetermined deviation amount may vary between the control automation modules. In some embodiments, the predetermined deviation amount may be the same among the control automation modules.

In some embodiments, the predetermined deviation amount may be altered or adjusted from time to time. In some embodiments, the predetermined deviation amount may be altered to adjusted if a component (e.g., module, system, and/or the like) of the drift detection and removal system triggers such an alteration or adjustment. For instance, and by way of non-limiting example, the drift detection and removal system may determine, in response to an unusual increase in indications of performance drift, the declarative mapping protocol (e.g., the legibility threshold value) should be adjusted to better handle the environment the control automation module (e.g., document classification module, document field extraction module, and/or the like) is situated in. In this way, the drift detection and removal system may adjust the declarative mapping protocol in response to downstream processes of the system.

As shown in block 214, the process flow 200 of this embodiment includes determining one or more prescriptive actions for the one or more deviation instances. In some embodiments, the determination of the prescriptive actions may involve identification and prioritization of the deviation instances; a root cause analysis (e.g., determining underlying factors contributing to the deviation); evaluation of potential actions (e.g., the impact of the prescriptive action's impact on the system); implementation of the prescriptive actions; and/or monitoring the feedback of the system after the prescriptive actions have been implemented.

In some embodiments, the identification and prioritization of the deviation instances may involve prioritization of deviation instances in response to the severity level of the deviation instance(s) and the impact the deviation instance (s) may have on the system. In some embodiments, the root cause analysis may include analyzing historical data records (e.g., historical data records of the system, historical data records of the control automation module(s), and/or the like) to determine how the deviation instance originated. In some embodiments, the drift detection and removal system may initiate simulations of key components in an attempt to isolate the causes of the deviation instances.

In some embodiments, evaluating the potential actions of the one or more prescriptive actions may include evaluating potential prescriptive action(s) that could be taken to address (e.g., correct) the deviation instances. In this way, the drift detection and removal system may analyze a range of factors the prescriptive action may have on the system, such as feasibility of implementation of the prescriptive action, impact the prescriptive action may have on operations, resources required to implement the prescriptive action, and/or the like.

As shown in block 216, the process flow 200 of this embodiment includes implementing, using an intelligence restoration module, the one or more prescriptive actions on the one or more control automation modules. In some embodiments, implementing the one or more prescriptive actions may include selecting and implementing one or more prescriptive actions for a singular control automation module. In some embodiments, implementing the prescriptive actions may include adjusting settings, configurations, processes, protocols, and/or the like of the one or more control automation modules.

FIG. 3 illustrates a process flow 300 for determining a deviation classification of the graphical representation, in accordance with an embodiment of the disclosure. The process flow may be carried out by various components of the distributed computing environment 100 discussed herein (e.g., the system 130, one or more end-point device(s) 140, etc.). An example system may include at least one processing device and at least one non-transitory storage device containing instructions when executed by the processing device, causing the processing device to carry out the method discussed herein.

In some embodiments, a drift detection and removal system (e.g., similar to one or more of the systems described herein with respect to FIGS. 1A-1C) may perform one or more of the steps of process flow 300. For example, a drift detection and removal system (e.g., the system 130 described herein with respect to FIGS. 1A-IC) may perform the steps of process flow 300.

As shown in block 302, the process flow 300 of this embodiment includes in response to transmitting the data stream to the gauging and monitoring module, transmitting the data stream to a data distribution analyzer, wherein the data distribution analyzer is configured to create a graphical representation of the data stream, and wherein the graphical representation comprises one or more representations of the data stream.

As used herein, a "data distribution analyzer" may perform various functions on the data stream. In some embodiments, the data distribution analyzer may create a graphical representation of the data stream. In some embodiments, the graphical representation may take on a variety of forms. In some embodiments, the graphical representation may include a distribution density of the data stream. In some embodiments, the distribution density of the data stream may include the representing the distribution density in the form of a kernel plot or a density plot. For instance, and by way of non-limiting example, the distribution density of the data stream may represent the distribution of particular instances of the data stream over a period of time. In this way, the graphical representation may represent the end decisioning instances over a period of time.

In some embodiments, the graphical representation may include a probability density of the data stream. In some embodiments, the probability density may represent a likelihood of a particular variable taking on a given value (e.g., expected value, or the like). In this way, the probability density may describe the probability of the particular variable falling within a particular range (e.g., expected range, or the like). For instance, and by way of non-limiting example, the graphical representation may represent the likelihood of an end decisioning operation taking on a particular value (e.g., expected value) within a particular range (e.g., expected range).

As shown in block 304, the process flow 300 of this embodiment includes determining, using an intelligence monitoring module, a deviation classification of the graphical representation. As used herein, an "intelligence monitoring module" may be capable of classifying the deviation of the graphical representation. In some embodiments, the deviation classification may be based on a comparison of the data stream (e.g., the current data stream) and a baseline data stream. In some embodiments, the baseline data stream may represent an expected (e.g., normal, standard, and/or the like) behavior of the data. In some embodiments, the baseline data stream may represent the initial training data used to train the one or more control automation modules. In some embodiments, the data stream (e.g., current data streams) may be compared against the baseline data stream and associated expected behavior. In this way, the intelligence monitoring module may determine the deviation classification in response to comparing the expected response (e.g., using the baseline data stream) with the data stream (e.g., current data stream).

As shown in block 306, the process flow 300 of this embodiment includes determining that the deviation classification is associated with a deviation in performance. In some embodiments, the deviation classification may be associated with a deviation in performance when the behavior of the system deviates from the expected behavior of the system. In some embodiments, the drift detection and removal system may classify the severity of the deviation in performance. In some embodiments, the severity of the deviation in performance may require the drift detection and removal system to take a responsive action. In some embodiments, in response to the severity of the deviation in performance being severe enough, the responsive action may include retraining the one or more control automation modules with a larger dataset. In this way, the drift detection and removal system may increase the size of the dataset the control automation module was initially trained on in an effort to mitigate the deviation in performance associated with the control automation module.

As shown in block 308, the process flow 300 of this embodiment includes determining a retraining protocol in response to determining that the deviation classification is associated with the deviation in performance. In some embodiments, analyzing the potential retraining protocols may include identifying and selecting the deviation classification; performing a root cause analysis on the deviation classification; evaluation of potential retraining protocols; implementing one or more potential retraining protocols; and/or monitoring the feedback of the system after the one or more retraining protocols have been implemented.

In some embodiments, the retraining protocol may include analyzing severity level associated with the deviation in performance. In some embodiments, in response to the severity level being severe enough, the drift detection and removal system may analyze one or more potential retraining protocols. In some embodiments, the drift detection and removal system may determine a retraining protocol in response to changes in one or more of: the context of the control automation module, the environment of the control automation module, the usage of the control automation module, and/or the like.

As shown in block 310, the process flow 300 of this embodiment includes implementing the retraining protocol on the one or more control automation modules. In some embodiments, the retraining protocol may include retraining the control automation module with new training data, adjusting the control automation module with existing model parameters to better fit the environment in which the control automation module is situated, and/or the like.

For instance, and by way of non-limiting example, the drift detection and removal system may determine that a retraining protocol is required for a control automation module (e.g., a data reconciliation module). In this way, the drift detection and removal system may determine that certain data are no longer required to be reconciled due to a change in the usage of the data reconciliation module (e.g., the certain data has changed in its use, functionality, definition, and/or the like over time). In this embodiment, the drift detection and removal system may retrain the data reconciliation module with either new data or may adjust the data reconciliation module in response to the deviation in performance of the data reconciliation module.

As shown in block 312, the process flow 300 of this embodiment includes determining that the deviation classification is associated with a deviation in procedure. In some embodiments, a deviation in procedure may include a change in the process or procedure of the drift detection and removal system. In some embodiments, the drift detection and removal system may analyze the data stream and compare it to the expected declarative mapping protocol. In some embodiments, the drift detection and removal system may also analyze the data stream and compare it to other relevant procedures and/or guidelines that have been established for the particular process being monitored (e.g., a regulatory framework established to ensure compliance with certain rules, regulations, laws, and/or the like). In some embodiments, the drift detection and removal system may analyze the data stream with algorithms, analytical tools, expected trends, and/or the like to determine a deviation in procedure.

In some embodiments, the drift detection and removal system may intelligently interpret (e.g., determine) procedure changes using Bidirectional Encoder Representations from Transformers (hereinafter "BERT"). In this way, BERT may be implemented to analyze natural language text of the data stream (e.g., analyze the textual data associated with the control automation modules) and determine potential deviations in procedure. In some embodiments, the drift detection and removal system may be trained on a specified structured dataset that describes an expected procedure for a given task (e.g., an expected outcome of a particular control automation module). For instance, and by way of non-limiting example, the drift detection and removal system may train a document classification module to identify certain keywords, phrases, string elements, numbers, and/or the like to produce an expected classification of a document. Further, the drift detection and removal system may implement BERT to compare the data stream associated with the document classification module with the expected procedure. In this case, in response to BERT identifying and detecting deviations in the textual data from the document classification module from the expected procedure, the drift detection and removal system may classify the deviation as a deviation in procedure.

As shown in block 314, the process flow 300 of this embodiment includes determining an intelligent interpretation protocol in response to determining that the deviation classification is associated with the deviation in procedure. As used herein, the intelligent interpretation protocol may include determining the cause of the deviation in performance. In some embodiments, determining the cause of the deviation in performance may include analyzing one or more procedures associated with the data stream and identifying changes in those procedures.

In some embodiments, determining the cause of the deviation in performance may include comparing current procedures with historical procedures. In some embodiments, the historical procedures may be a predetermined set of procedures implemented during the initial training of the drift detection and removal system. In some embodiments, the historical procedures may be any one of a shifting iterative set of procedures used by the drift detection and removal system. In some embodiments, the intelligent interpretation protocol may include suggesting one or more procedural corrective actions.

As shown in block 316, the process flow 300 of this embodiment includes implementing the intelligent interpretation protocol on the one or more control automation modules. In some embodiments, implementing the intelligent interpretation protocol may include adjusting the parameters of the control automation modules, retraining the control automation modules, providing additional training data to the control automation modules, and/or the like. In some embodiments, a user, technician, manager, and/or the like of the drift detection and removal system may implement the intelligent interpretation protocol on the one or more control automation modules.

FIG. 4 illustrates a process flow 400 for determining a drift classification of the data stream, in accordance with an embodiment of the disclosure. The process flow may be carried out by various components of the distributed computing environment 100 discussed herein (e.g., the system 130, one or more end-point device(s) 140, etc.). An example system may include at least one processing device and at least one non-transitory storage device containing instructions when executed by the processing device, causing the processing device to carry out the method discussed herein.

In some embodiments, a drift detection and removal system (e.g., similar to one or more of the systems described herein with respect to FIGS. 1A-1C) may perform one or more of the steps of process flow 400. For example, a drift detection and removal system (e.g., the system 130 described herein with respect to FIGS. 1A-1C) may perform the steps of process flow 400.

As shown in block 402, the process flow 400 of this embodiment includes determining, using the intelligence restoration module, a drift classification of the data stream. In some embodiments, the intelligence restoration module may compare the data stream (e.g., current data stream) with the baseline data stream (e.g., initial training data of the control automation modules). In some embodiments, the intelligence restoration module may identify drifts in the data distribution (e.g., graphical representation) which indicate the control automation module is no longer accurately representing the underlying data. In some embodiments, the drift detection and removal system may calculate differences (e.g., divergence) between the current data distribution (e.g., graphical representation created in response to the current data stream) and the baseline data distribution (e.g., graphical representation created in response to the baseline data stream). In some embodiments, the calculating the difference between the current data distribution and the baseline data distribution may be performed through a variety of methods.

As shown in block 404, the process flow 400 of this embodiment includes determining that the drift classification is associated with a data drift classification. In some embodiments, the drift detection and removal system may determine a data drift classification in response to a change in the expected outcome from one or more control automation modules. In some embodiments, the baseline data stream and the current data stream may be compared to determine the differences (e.g., divergence) in the ranges of the datasets.

As shown in block 406, the process flow 400 of this embodiment includes determining a range of one or more individual features in response to determining that the drift classification is associated with the data drift classification. In some embodiments, the drift detection and removal system may determine a range of one or more individual features of the data stream may take. In this way, the drift detection and removal system may determine the range the individual features may take through a variety of forms. For instance, and by way of non-limiting example, the drift detection and removal system may determine that certain individual features of the data stream may take a particular range of values through analyzing historical data of the individual features. In another non-limiting example, the drift detection and removal system may create models that represent the expected values of the individual features.

As shown in block 408, the process flow 400 of this embodiment includes calculating a data feature importance threshold. In some embodiments, calculating the data feature importance threshold may include determining which features (e.g., individual features) in the data stream are most important for identifying (e.g., determining) data drift. In some embodiments, determining which features in the data stream are most important for identifying data drift may include analyzing the data feature's impact, analyzing historical data associated with the data feature, statistical analysis of the data feature, and/or the like. In some embodiments, the drift detection and removal system may calculate the data feature importance threshold in response to how much the data feature contributes to data drift. In this way, the data feature importance threshold may be used to determine whether the data feature(s) have drifted beyond an acceptable data drift range. In some embodiments, the acceptable data drift range may be determined (e.g., predetermined) by the drift detection and removal system. In some embodiments, the acceptable data drift range may be determined by a manager of the drift detection and removal system.

As shown in block 410, the process flow 400 of this embodiment includes creating a suggested data drift model. In some embodiments, creating a suggested data drift model may include incorporating the calculated data feature importance threshold with the suggested model to create the suggested data drift model. In some embodiments, the data drift model may be created to mitigate, eliminate, counteract, and/or the like, the effects of the data drift of the one or more control automation modules.

In some embodiments, the drift detection and removal system may implement the suggested data drift model on the one or more control automation modules. In some embodiments, implementing the suggested data drift model on the one or more control automation modules may include updating the one or more control automation modules with the suggested data drift model. In some embodiments, the data drift model may adjust, change, update, and/or the like the parameters of the one or more control automation modules. For instance, and by way of non-limiting example, the drift detection and removal system may create a suggest data drift model in response to the historical data of individual features of the control automation modules. In this way, the suggested data drift model may include updating the parameters of the control automation modules in response to any trends within the historical data.

As shown in block 412, the process flow 400 of this embodiment includes determining that the drift classification is associated with a performance drift classification. In some embodiments, the drift detection and removal system may determine a performance drift classification in response to analyzing the performance of the one or more control automation modules. In some embodiments, determining a performance drift classification may include analyzing the deviation instances. In some embodiments, determining a performance drift classification may include monitoring the one or more control automation model's performance over a period of time. In some embodiments, the performance of the control automation modules may include accuracy, loss, confusion matrix, Area Under ROC Curve (AUC), Mean Absolute Error (MAE), Root Mean Square Error (RMSE), R Square, and/or the like. In some embodiments, the period of time may be determined (e.g., predetermined) by the drift detection and removal system, by a manager of the drift detection and removal system, by a technician of the drift detection and removal system, and/or the like. In some embodiments, the period of time may be adjusted (e.g., changed) by the drift detection and removal system, by the manager of the drift detection and removal system, by the technician of the drift detection and removal system, and/or the like.

In some embodiments, the drift detection and removal system may compare the data stream (e.g., current data stream) with a baseline data stream (e.g., initial training data of the control automation modules) to observe the performance of the control automation modules. In some embodiments, determining a performance drift may include using a real-world dynamic dataset as a training set for iterative model building. For instance, and by way of non-limiting example, if the performance (e.g., accuracy) of the control automation module is outside an acceptable performance range compared to the expected value, the drift detection and removal system may classify the drift as a performance drift.

In some embodiments, performance drift may include a change in specific vocabulary used in an industry where the one or more control automation modules are situated. For instance, and by way of non-limiting example, the industry may alter vocabulary used to define a certain document. In this case, a control automation module (e.g., a document classification module) may encounter performance drift in response to the change in specific vocabulary. In some embodiments, performance drift may include a change in the nature of work in the industry where the one or more control automation modules are situated. In this way, a control automation module may encounter performance drift in response to a change in the nature of work.

As shown in block 414, the process flow 400 of this embodiment includes transmitting the data stream to a bias correction module in response determining that the drift classification is associated with the performance drift classification. In some embodiments, the bias correction module may be used to correct underlying system error introduced into the control automation module during training of the control automation module. In some embodiments, the bias correction module further comprises at least one of: a representational bias module configured to mitigate representational bias of the data stream; a confirmation bias module configured to mitigate confirmation bias of the data stream; a selection bias module configured to mitigate selection bias of the data stream; or a survivorship bias module configured to mitigate survivorship bias of the data stream.

In some embodiments, the representational bias module may be configured to mitigate representational bias of the data stream. In some embodiments, the representational bias of the data stream may occur when the one or more control automation modules cannot accurately represent the underlying data (e.g., input data) due to limitations of the one or more control automation modules. In some embodiments, the limitations may include limitations from the architecture of the control automation modules, complexity (or lack thereof) of the control automation modules, and/or the like. In some embodiments, the representational bias module may be configured to modify the architecture of the one or more control automation modules. In some embodiments, the representational bias module may be configured to modify the complexity of the one or more control automation modules.

In some embodiments, the confirmation bias module may be configured to mitigate confirmation bias of the data stream. In some embodiments, the confirmation bias of the data stream may occur when the one or more control automation modules are trained on data which confirms a preexisting outcome. In some embodiments, the confirmation bias module may be configured to ensure the training dataset is diverse.

In some embodiments, the selection bias module may be configured to mitigate selection bias of the data stream. In some embodiments, the selection bias of the data stream may occur when the data the one or more control automation modules was trained on represents a portion of the population the control automation module was intended to operate within. In some embodiments, the portion of the population may be less than the entirety of the population the control automation module was intended to operate within. In some embodiments, the selection bias module may be configured to ensure the training dataset accurately represents the population the control automation module was intended to operate within.

In some embodiments, the survivorship bias module may be configured to mitigate survivorship bias of the data stream. In some embodiments, the survivorship bias of the data stream may occur when the one or more control automation modules are trained on a subset of the complete dataset. In some embodiments, the survivorship bias module may be configured to ensure the training dataset is a complete dataset.

As shown in block 416, the process flow 400 of this embodiment includes monitoring the data stream for a concept drift. As used herein, concept drift may include the process of detecting changes in the relationships within the data stream. In some embodiments, the concept drift may include detecting a steady change of the data stream, a periodic change of the data stream, a recurring change of the data stream, a sudden change of the data stream, a sweeping change of the data stream, and/or the like.

In some embodiments, monitoring the data stream may include continuously comparing a prediction of the data stream against the actual outcome of the data stream. In some embodiments, in response to the prediction error rate exceeding a prediction error rate threshold, the drift detection and removal system may determine the presence of concept drift.

As shown in block 418, the process flow 400 of this embodiment includes calculating a performance feature importance threshold. In some embodiments, calculating a performance feature importance threshold may include determining a range of one or more individual features, in response to determining that the drift classification is associated with the performance drift classification.

In some embodiments, the performance feature importance threshold may include determining which features (e.g., individual features) which are most important for identifying (e.g., determining) performance drift. In some embodiments, determining which features in the data stream are most important for identifying performance drift may include analyzing the impact of the feature, analyzing historical data associated with the feature, statistical analysis of the feature, and/or the like. In some embodiments, the drift detection and removal system may calculate the performance feature importance threshold in response to how much the feature contributes to performance drift. In this way, the feature performance feature importance threshold may be used to determine whether the performance of the control automation module has drifted beyond an acceptable performance drift range. In some embodiments, the acceptable performance drift range may be determined (e.g., predetermined) by the drift detection and removal system. In some embodiments, the acceptable performance drift range may be determined by a manager of the drift detection and removal system.

As shown in block 420, the process flow 400 of this embodiment includes creating a suggested performance drift model. In some embodiments, creating a suggested performance drift model may include incorporating the calculated performance feature importance threshold within the suggested model to create the suggested performance drift model. In some embodiments, the suggested performance drift model may be created to mitigate, eliminate, counteract, and/or the like, the effects of the performance drift of the one or more control automation modules.

In some embodiments, the drift detection and removal system may implement the suggested performance drift model on the one or more control automation modules. In some embodiments, implementing the suggested performance drift model on the one or more control automation modules may include updating the one or more control automation modules with the suggested performance drift module. In some embodiments, the suggested performance drift module may adjust, change, update, and/or the like, the parameters of the one or more control automation modules. For instance, and by way of non-limiting example, in response to a control automation module becoming less accurate over a period of time, the suggested performance drift model may include new environmental factors in which the control automation model is situated to improve the accuracy. Further, the suggested performance drift model may update the parameters of the control automation module in response to the new factors, thereby improving accuracy of the control automation module.

FIG. 5 illustrates a process flow 500 for a non-limiting example process flow of the drift detection and removal system, in accordance with an embodiment of the disclosure. The process flow may be carried out by various components of the distributed computing environment 100 discussed herein (e.g., the system 130, one or more end-point device(s) 140, etc.). An example system may include at least one processing device and at least one non-transitory storage device containing instructions when executed by the processing device, causing the processing device to carry out the method discussed herein.

In some embodiments, a drift detection and removal system (e.g., similar to one or more of the systems described herein with respect to FIGS. 1A-1C) may perform one or more of the steps of process flow 500. For example, a drift detection and removal system (e.g., the system 130 described herein with respect to FIGS. 1A-1C) may perform the steps of process flow 500.

As shown in block 502, the process flow 500 of this embodiment includes receiving one or more inputs from one or more control automation modules. In some embodiments, the inputs received may include the data from the one or more control automation modules. In some embodiments, the data from the one or more control automation modules may include data from a document classification module, a document field extraction module, a data validation module, a data reconciliation module, a condition monitoring module, an end decisioning module, a need of remediation module, and/or the like.

As shown in block 504, the process flow 500 of this embodiment includes transmitting the one or more inputs received from the one or more control automation modules to a data lake.

As shown in block 506, the process flow 500 of this embodiment includes creating a data stream in response to the data transmitted to the data lake.

As shown in block 508, the process flow 500 of this embodiment includes transmitting the data stream to a gauging and monitoring module. In some embodiments, the gauging and monitoring module may include a data distribution analyzer. In some embodiments, the data distribution analyzer may analyze the ingested (e.g., received) data to identify any bias in the system. In some embodiments, the drift detection and removal system may transmit the data to a data distribution analyzer. In some embodiments, the data distribution analyzer may, in response to receiving the data stream, calculate a distribution density, a probability density, and/or the like. In some embodiments, the data distribution analyzer may create a graphical representation of the data stream in response to calculating the distribution density, the probability density, and/or the like.

As shown in block 510, the process flow 500 of this embodiment includes comparing the data stream with a declarative mapping protocol. In some embodiments, the declarative mapping protocol may include the permissible threshold intelligence limits of the one or more control automation modules. In some embodiments, the declarative mapping protocol may compared with the intelligence of the control automation modules to determine whether one or more deviation instances has occurred.

As shown in block 512, the process flow 500 of this embodiment includes determining whether one or more deviation instances has occurred. In some embodiments, the drift detection and removal system may periodically track the intelligence level of the one or more control automation modules. In some embodiments, the drift detection and removal system, in response to the periodic tracking of the intelligence levels of the one or more control automation modules, may determine a deviation instance has occurred.

As shown in block 514, the process flow 500 of this embodiment includes creating a prescriptive action. In some embodiments, the prescriptive action may restore intelligence to the one or more control automation modules. In some embodiments, the prescriptive action may determine the reason for deviation in intelligence of the one or more control automation modules.

As shown in block 516, the process flow 500 of this embodiment includes transmitting the prescriptive action to an intelligence restoration module. In some embodiments, the intelligence restoration module may implement the prescriptive action on the one or more control automation modules.

As shown in block 518, the process flow 500 of this embodiment includes implementing the prescriptive action on the one or more control automation modules. In some embodiments, the parameters, settings, and/or the like of the one or more control automation modules may be adjusted, tuned, updated, and/or the like by the prescriptive action. In some embodiments, the drift detection and removal system may continuously monitor the one or more control automation modules after the implementation of the prescriptive action to determine the effectiveness of the prescriptive action.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring and removing drift in machine learning models, the system comprising:

a processing device;

a non-transitory storage device containing instructions when executed by the processing device, causes the processing device to perform the steps of:

receive, from one or more control automation modules, a data stream, wherein the data stream comprises data associated with the one or more control automation modules;

transmit the data stream to a gauging and monitoring module, wherein the gauging and monitoring module includes a data distribution analyzer configured to create a graphical representation of the data stream, wherein the graphical representation includes a probability density that represents a likelihood a particular value takes an expected value;

determine whether the data stream matches a declarative mapping protocol, wherein the declarative mapping protocol defines an expected format and structure of the data stream such that deviations can be detected and removed;

determine one or more deviation instances in an instance in which the data stream does not match the declarative mapping protocol using a predetermined deviation amount for each of the one or more deviation instances, wherein the predetermined deviation amount is configured to be tailored to an environment in which each of the one or more control automation modules are situated;

determine, using an intelligence monitoring module, a deviation classification of the graphical representation, wherein the deviation classification is at least a deviation in performance, and wherein the deviation in performance is based on a change in vocabulary in an industry where the one or more control automation models are situated;

determine one or more prescriptive actions for the one or more deviation instances, wherein the one or more prescriptive actions include at least:

identification and prioritization of the one or more deviation instances;

a root cause analysis of the one or more deviation instances; and evaluation of potential downstream actions of the one or more deviation instances, wherein evaluation of the potential downstream actions comprise a feasibility study of implementation of the one or more prescriptive actions; and implement, using an intelligence restoration module, the one or more prescriptive actions on the one or more control automation modules.

2. The system of claim 1, wherein executing the instructions further causes the processing device to:

receive, from one or more control automation modules, a data lake, wherein the data lake comprises data associated with the one or more control automation modules; and transform the data lake into a data stream.

3. The system of claim 1, wherein executing the instructions further causes the processing device to:

determine a retraining protocol in response to determining that the deviation classification is associated with the deviation in performance; and implement the retraining protocol on the one or more control automation modules.

4. The system of claim 1, wherein executing the instructions further causes the processing device to:

determine that the deviation classification is associated with a deviation in procedure;

determine an intelligent interpretation protocol in response to determining that the deviation classification is associated with the deviation in procedure; and implement the intelligent interpretation protocol on the one or more control automation modules.

5. The system of claim 1, wherein executing the instructions further causes the processing device to determine, using the intelligence restoration module, a drift classification of the data stream.

6. The system of claim 5, wherein executing the instructions further causes the processing device to:

determine that the drift classification is associated with a data drift classification;

determine a range of one or more individual features in response to determining that the drift classification is associated with the data drift classification;

calculate a data feature importance threshold; and create a suggested data drift model.

7. The system of claim 5, wherein executing the instructions further causes the processing device to:

determine that the drift classification is associated with a performance drift classification;

transmit the data stream to a bias correction module in response determining that the drift classification is associated with the performance drift classification;

monitor the data stream for a concept drift;

calculate a performance feature importance threshold; and create a suggested performance drift model.

8. The system of claim 7, wherein the bias correction module further comprises at least one of:

a representational bias module configured to mitigate representational bias of the data stream;

a confirmation bias module configured to mitigate confirmation bias of the data stream;

a selection bias module configured to mitigate selection bias of the data stream; or a survivorship bias module configured to mitigate survivorship bias of the data stream.

9. A computer program product for monitoring and removing drift in machine learning models, the computer program product comprising at least one non-transitory computer-readable medium having computer-readable program code portions embodied therein, the computer-readable program code portions comprising:

an executable portion configured to receive, from one or more control automation modules, a data stream, wherein the data stream comprises data associated with the one or more control automation modules;

an executable portion configured to transmit the data stream to a gauging and monitoring module, wherein the gauging and monitoring module includes a data distribution analyzer configured to create a graphical representation of the data stream, wherein the graphical representation includes a probability density that represents a likelihood a particular value takes an expected value;

an executable portion configured to determine whether the data stream matches a declarative mapping protocol, wherein the declarative mapping protocol defines an expected format and structure of the data stream such that deviations can be detected and removed;

an executable portion configured to determine one or more deviation instances in an instance in which the data stream does not match the declarative mapping protocol using a predetermined deviation amount for each of the one or more deviation instances, wherein the predetermined deviation amount is configured to be tailored to an environment in which each of the one or more control automation modules are situated;

an executable portion configured to determine, using an intelligence monitoring module, a deviation classification of the graphical representation, wherein the deviation classification is at least a deviation in performance, and wherein the deviation in performance is based on a change in vocabulary in an industry where the one or more control automation models are situated;

an executable portion configured to determine one or more prescriptive actions for the one or more deviation instances, wherein the one or more prescriptive actions include at least:

identification and prioritization of the one or more deviation instances;

a root cause analysis of the one or more deviation instances; and evaluation of potential downstream actions of the one or more deviation instances, wherein evaluation of the potential downstream actions comprise a feasibility study of implementation of the one or more prescriptive actions; and an executable portion configured to implement, using an intelligence restoration module, the one or more prescriptive actions on the one or more control automation modules.

10. The computer program product of claim 9, wherein the computer program product further comprises an executable portion configured to:

receive, from one or more control automation modules, a data lake, wherein the data lake comprises data associated with the one or more control automation modules; and transform the data lake into a data stream.

11. The computer program product of claim 9, wherein the computer program product further comprises an executable portion configured to:

determine a retraining protocol in response to determining that the deviation classification is associated with the deviation in performance; and implement the retraining protocol on the one or more control automation modules.

12. The computer program product of claim 9, wherein the computer program product further comprises an executable portion configured to:

determine that the deviation classification is associated with a deviation in procedure;

determine an intelligent interpretation protocol in response to determining that the deviation classification is associated with the deviation in procedure; and implement the intelligent interpretation protocol on the one or more control automation modules.

13. The computer program product of claim 9, wherein the computer program product further comprises an executable portion configured to determine, using the intelligence restoration module, a drift classification of the data stream.

14. The computer program product of claim 13, wherein the computer program product further comprises an executable portion configured to:

determine that the drift classification is associated with a data drift classification;

determine a range of one or more individual features in response to determining that the drift classification is associated with the data drift classification;

calculate a data feature importance threshold; and create a suggested data drift model.

15. The computer program product of claim 13, wherein the computer program product further comprises an executable portion configured to:

determine that the drift classification is associated with a performance drift classification;

transmit the data stream to a bias correction module in response determining that the drift classification is associated with the performance drift classification;

monitor the data stream for a concept drift;

calculate a performance feature importance threshold; and create a suggested performance drift model.

16. The computer program product of claim 15, wherein the bias correction module further comprises at least one of:

a representational bias module configured to mitigate representational bias of the data stream;

a confirmation bias module configured to mitigate confirmation bias of the data stream;

a selection bias module configured to mitigate selection bias of the data stream; or a survivorship bias module configured to mitigate survivorship bias of the data stream.

17. A computer-implemented method for monitoring and removing drift in machine learning models, the computer-implemented method comprising:

receiving, from one or more control automation modules, a data stream, wherein the data stream comprises data associated with the one or more control automation modules;

transmitting the data stream to a gauging and monitoring module, wherein the gauging and monitoring module includes a data distribution analyzer configured to create a graphical representation of the data stream, wherein the graphical representation includes a probability density that represents a likelihood a particular value takes an expected value;

determining whether the data stream matches a declarative mapping protocol, wherein the declarative mapping protocol defines an expected format and structure of the data stream such that deviations can be detected and removed;

determining one or more deviation instances in an instance in which the data stream does not match the declarative mapping protocol using a predetermined deviation amount for each of the one or more deviation instances, wherein the predetermined deviation amount is configured to be tailored to an environment in which each of the one or more control automation modules are situated;

determining, using an intelligence monitoring module, a deviation classification of the graphical representation, wherein the deviation classification is at least a deviation in performance, and wherein the deviation in performance is based on a change in vocabulary in an industry where the one or more control automation models are situated;

determining one or more prescriptive actions for the one or more deviation instances wherein the one or more prescriptive actions include at least:

identification and prioritization of the one or more deviation instances;

a root cause analysis of the one or more deviation instances; and evaluation of potential downstream actions of the one or more deviation instances, wherein evaluation of the potential downstream actions comprise a feasibility study of implementation of the one or more prescriptive actions; and implementing, using an intelligence restoration module, the one or more prescriptive actions on the one or more control automation modules.

18. The computer-implemented method of claim 17, further comprising:

receiving, from one or more control automation modules, a data lake, wherein the data lake comprises data associated with the one or more control automation modules; and transforming the data lake into a data stream.

* * * * *